(12) United States Patent
Kwok et al.

(10) Patent No.: US 6,454,977 B1
(45) Date of Patent: Sep. 24, 2002

(54) PROCESS FOR MAKING BATTERY PLATE

(75) Inventors: Wellington Y. Kwok, Fishers; Gary L. Ballard, Carmel, both of IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/519,555

(22) Filed: Mar. 6, 2000

Related U.S. Application Data

(60) Provisional application No. 60/167,748, filed on Nov. 29, 1999.

(51) Int. Cl.[7] .................... C04B 35/00; B32B 15/04
(52) U.S. Cl. ............. 264/104; 264/171.22; 264/259; 264/265; 264/271.1
(58) Field of Search ............ 264/171.22, 104, 264/259, 265, 271.1

(56) References Cited

U.S. PATENT DOCUMENTS

| | | | |
|---|---|---|---|
| 3,859,135 A | * | 1/1975 | Roberts et al. ........... 136/27 |
| 3,894,886 A | | 7/1975 | Pankow et al. ........... 136/67 |
| 4,902,532 A | | 2/1990 | Seo .......................... 427/58 |
| 4,909,955 A | | 3/1990 | Morris et al. .......... 252/182.1 |
| 5,096,611 A | | 3/1992 | Matthew et al. ....... 252/182.1 |
| 5,290,359 A | | 3/1994 | Coonen et al. ............ 118/712 |
| 5,510,213 A | | 4/1996 | Gagnon et al. ............. 429/225 |
| 6,299,342 B2 | * | 10/2001 | Eggen et al. ................ 366/81 |

FOREIGN PATENT DOCUMENTS

| | | |
|---|---|---|
| DE | 2713453 | 10/1977 |
| DE | 3136933 | 3/1983 |
| DE | 3318599 | 11/1984 |

OTHER PUBLICATIONS

Pavlov et al, "A New Technology for Preparation of Pastes for Lead–Acid Batteries," The Battery Man, Apr. 1998.

* cited by examiner

*Primary Examiner*—Christopher A. Fiorilla
(74) *Attorney, Agent, or Firm*—Margaret A. Dobrowitsky

(57) ABSTRACT

A continuous paste making process for lead acid batteries that includes the steps of mixing water with a lead oxide, reaction an acid with the lead oxide in a mixture to produce lead acid compounds, and forming a paste including interlocking lead acid crystals from the lead acid compounds, where the mixing, reacting, and crystal forming steps occur in an extrusion apparatus. The method also includes the step of extruding the paste from the extrusion apparatus into a grid where the paste is dried to form a battery plate of the lead-acid battery.

17 Claims, 2 Drawing Sheets

PROCESS FOR MAKING BATTERY PLATE

RELATED APPLICATIONS

This application claims the benefit of U.S. Provisional Application Ser. No. 60/167,748 filed Nov. 29, 1999.

FIELD OF THE INVENTION

The present invention relates to the field of paste making processes for lead-acid batteries.

BACKGROUND OF THE INVENTION

Battery plates are conventionally produced using a process that requires several heating, cooling, and handling steps. Under a generally followed batch process, a minimum batch size of about 2,400 to about 3,000 lbs. of dry leady oxide is typically used to produce about 7,000 to about 10,000 battery plates. The leady oxide is originally in powder form, and mixed with water to form aqueous slurry, and then reacted with a strong acid to produce a paste. The paste material is pressed onto an expanded grid, cut to a particular dimension, and flash dried at a high temperature. The plates thus produced are stacked on skids and transported to a steam chamber (for positive plates only) and eventually to a large curing room, where the skids of plates are cured for at least 3 to 4 days. Each skid holds between about 5,000 and about 10,000 plates. Once cured, the plates are retrieved and transported to a green group assembly.

Due to the long production time and stacking arrangement of the above process, it is commonly found that the quality, as well as the physical characteristics of the cured battery plates, varies widely. For example, the plates produced at the beginning of the batch are often of a different quality or are different physically from plates that are produced at the end of a batch. Furthermore, the plates often are found to vary considerably within a single plate stack.

Batches of the green batteries thus produced are sent to a formation area for material activation. Formation time is typically between about 18 and about 30 hours. The final process for finishing the formed batteries involves the steps of dumping all forming acid, refilling the batteries with the shipping acid, and sealing the batteries with a final cover.

The typical production time for a single battery, from mixing the oxide powders to finishing the product, is between about six and seven days. However, a production time of three to four weeks is not uncommon given the batch-and-queue operations commonly involved. Analysis of the above battery production process reveals that major bottlenecks occur at the curing step, and at the formation step.

Certain steps have been taken to provide more efficiency at the curing step. For example, curing rooms that are typically very large have been replaced with a number of small, environmental controlled curing chambers. As a result of this modification, the curing time has been significantly reduced. However, due to the cost associated with the sophisticated curing equipment, the minimum batch size at the curing step is limited to the number of plates on a skid instead of the size of a single plate stack, or even a single plate. Thus, the batch-and-queue mode must involve smaller batches, creating another efficiency limitation in the process.

There is therefore a need for an improved battery production process that involves a single piece flow instead of a flow by the batch. Accordingly, there is a need for a process that removes the batch-and-queue operation upstream in order to provide a meaningful, leaner process downstream. Any meaningful improvement in the process must involve faster initiation of reactions, and removal of excess water in a battery, and also the efficiency of these actions.

One publication discloses a continuous curing or pasting process. Pavlov, D. and P. Eirich, "*A New Technology for Preparation of Pastes for Lead-Acid Batteries,*" The Battery Man, Apr., 16 (1998), disclose a batch-type paste-making system that is based on the concept of producing basic lead sulfate complex crystals in a continuous process. The process disclosed in the publication uses a paste mixer that is a completely closed system, within which a vacuum can be created, thereby eliminating the effect of the surrounding medium on the paste particles produced by the process. The paste is produced by the addition of water to a leady oxide powder, and the subsequent reaction of $H_2SO_4$ with the leady oxide. The reaction is exothermic, and the heat released by the reaction is carried away by the endothermic process of water evaporation. Thus, the maintenance of a constant temperature in the closed system is an object, and a realization, of the process. When the temperature is maintained above 90° C. and a certain ratio of leady oxide and sulfuric acid is provided, the entire amount of leady oxide is converted into tetrabasic lead sulfate. A vacuum created in the closed system removes moisture until the paste is of the desired density. While the closed paste formation system is a departure from conventional paste formation processes, the pasting and curing steps of the process are extremely lengthy, requiring sixteen to twenty hours for formation of the battery plates once the paste is created. Accordingly, a bottleneck occurs at the pasting/curing step of the process disclosed in the publication.

There is therefore a need, in addition to those needs set forth above, for a continuous paste making process for a lead-acid battery that significantly shortens the plate production step. Such a process must overcome the rate-limiting step in the Pavlov et al. publication of pasting and curing the plates once the battery paste is formed.

SUMMARY OF THE INVENTION

It is an object of the present invention to meet the above-described needs and others. Specifically, the continuous paste making process for lead-acid batteries that includes the steps of mixing water with a lead oxide, reacting an acid with the lead oxide in a mixture to produce lead oxide-lead sulfate compounds, and forming a paste comprising interlocking basic lead sulfate complex crystals from the lead oxide-lead sulfate compounds, in accordance with the present invention is characterized in that the mixing, reacting, and crystal forming steps occur in an extrusion or a high-shear continuous processing apparatus. The method, in accordance with the present invention, is also characterized in that it further includes the step of extruding the paste from the extrusion apparatus into a grid mesh where the paste is dried to form a battery plate of the lead-acid battery.

It is preferred that the extrusion apparatus includes a first cylindrical bore having a first helical channel disposed therein, the rotation of which causes any material in the first helical channel to be moved toward a die orifice. The extrusion apparatus also preferably includes a second cylindrical bore having a second helical channel disposed therein, the rotation of which causes any material in the second helical channel to be forced through the die orifice as part of the extruding step. At least the mixing step preferably occurs in the first cylindrical bore. The reacting step most preferably also occurs in the first cylindrical bore. According to the preferred embodiment, the first cylindrical bore must be attached to the second cylindrical bore to allow the process to be continuous, and the first helical channel is disposed upstream relative to the second helical channel. The first helical channel is preferably physically separated from the second helical channel.

The acid used in the reacting step is preferably sulfuric acid. Depending on whether a positive or negative electrode is being produced, the interlocking basic lead sulfate complex crystals are either tetrabasic lead sulfate or tribasic lead sulfate.

The method preferably further includes the step of preheating the grid mesh to approximate a temperature of the paste when the paste is extruded from the extrusion apparatus. The amount of paste, and various properties of the paste can be controlled by bringing the grid mesh into contact with the paste by placing the grid on a conveyor that moves toward the extruder die orifice. The method then preferable includes the step of adjusting a quantity of paste to be extruded into the grid mesh by adjusting a speed of the conveyor. The extruding step can be performed as a sheathing process, a roll-forming process, a tape-casting process, or an injection molding process.

The paste forming step of the present invention includes removing a portion of the water from the mixture. If necessary, the paste forming step also includes adding an additional amount of water to the mixture to provide optimal rheological properties to the paste.

The reacting step of the present invention preferably includes the introducing the acid at a plurality of locations along the length of the extrusion apparatus. Water or other desired liquid can also be introduced at various locations of the extrusion apparatus. In either case, unidirectional valves may be incorporated to introduce the acid, water or other liquid.

The method also preferably includes the step of controlling a temperature inside the extruder to optimize the reacting step. Various conventional temperature control methods can be incorporated to meet this step.

If necessary, the method of the present invention further includes the step of adding chemical binders or reactants to the mixture prior to extrusion of said paste. The binders can be included to optimize the quality of the paste for formation within the grid mesh.

Additional objects, advantages and novel features of the invention will be set forth in the description which follows or may be learned by those skilled in the art through reading these materials or practicing the invention. The objects and advantages of the invention may be achieved through the means recited in the attached claims.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

The present invention applies an extrusion technique to battery production, similar to the technique that is well known in the plastics and ceramics processing industries. The process not only cuts down the inventories of raw materials as well as end products, i.e., battery plates, to essentially zero, but also reduces the work-in-process from thousands to tens, or even less. A working electrode may be produced in a single step by the process of the present invention. Using the drawings, the preferred embodiments of the present invention will now be explained.

Figure 1:
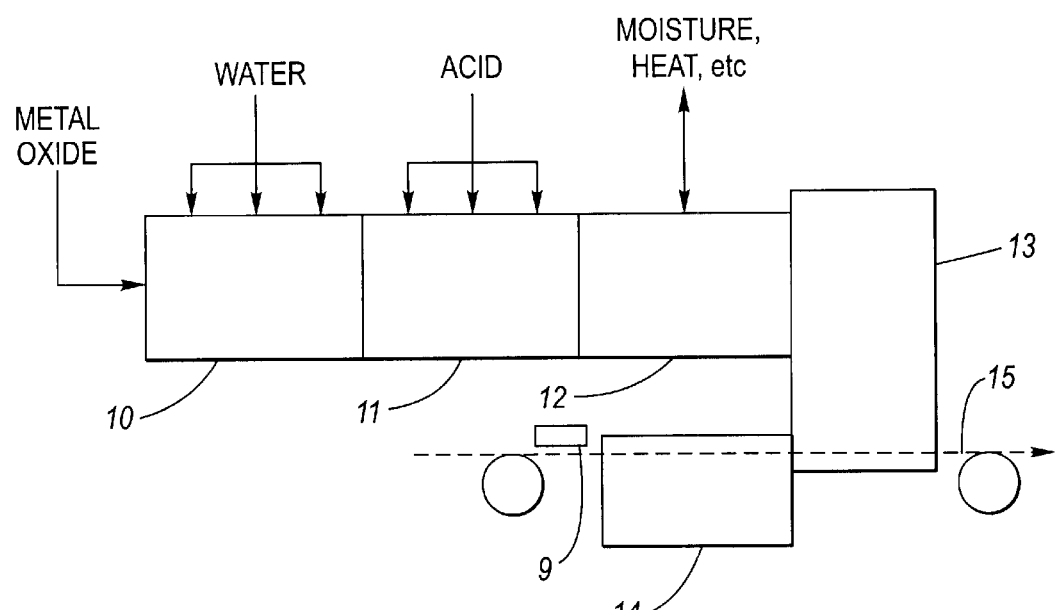
FIG. 1 shows a block diagram of the continuous pasting process of the present invention.

FIG. 1 shows a block diagram of the continuous pasting process of the present invention. Extrusion is an ideal process for forcing a highly viscous, dough-like material through an orifice. The process of battery production according to the present invention applies the principles of extrusion, and involves four zones, namely, a mixing zone 10, a reaction zone 11, a crystallization zone 12, and a pasting/drying zone 13.

Figure 2:
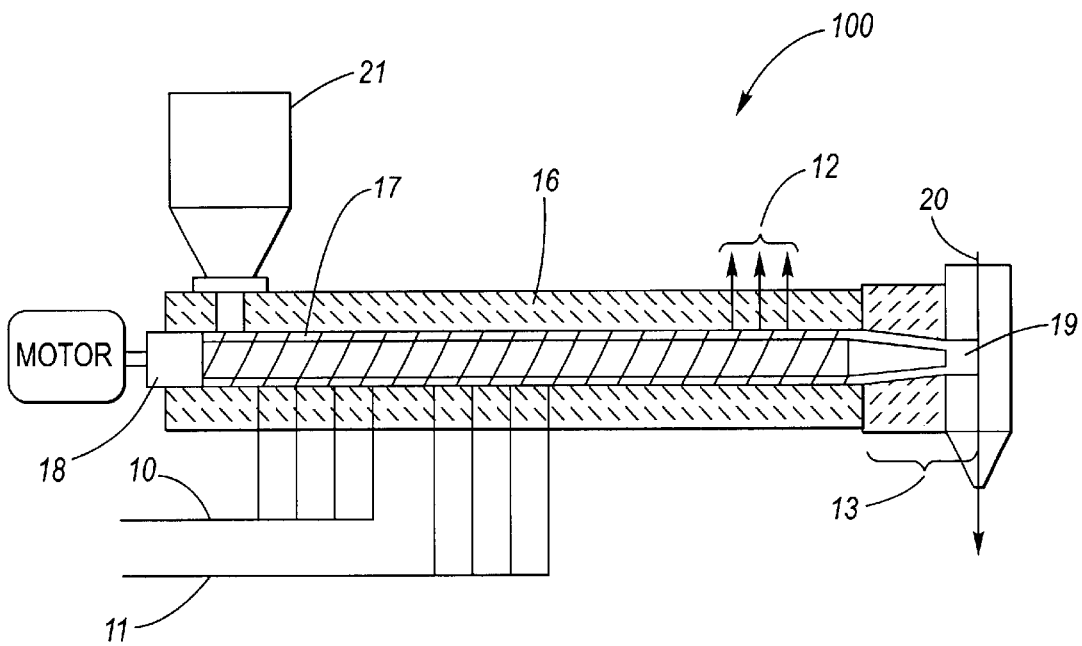
FIG. 2 shows a schematic illustration of the continuous pasting process of the present invention, as well as the extruder used in the process.

The solid material that includes the leady oxide, and that is introduced at a feed into the mixing zone 10, can include a substantially dry mixture of solid powder, plastic fibers, and other commonly used additives. The upstream portion of the extruder 100, shown in FIG. 2, is used simply to mix the solid components with a small amount of liquid. Such a mixing process has the advantage of providing a way for achieving higher solid content. Also, additional liquid components can be introduced downstream in order to provide a highly utilized/activated product that has the necessary proportions of all of the required materials.

Water is the main liquid dispersing agent mixed with the solid material, including the leady oxide, in the mixing zone 10. The water is added to form a paste in a mixer, and the mixture is mixed thoroughly.

In the reaction zone 12, an acid that is usually sulfuric acid is added to the mixture to react with the oxides. Seed crystals are thereby produced that can continue to grow at a relatively high temperature and form interlocking crystals that have a large saturated microstructure, i.e., tetrabasic lead sulfate (4BS).

In the crystallization zone 12, moisture and heat are released from the mixture. A small, but sufficient amount of liquid is maintained in the stiff plastic material, however. Because the entire process of the present invention takes place in a closed extruder, the heat energy generated in the mixing zone 10, and in the reaction zone 11 by the reaction between the sulfuric acid and the oxides, is retained and utilized to complete the microstructure growth in the crystallization zone 12.

Prior to pasting in the pasting unit 13, the expanded grid 9 is preferably pretreated in the grid treatment unit 14 in order to improve the material adhesion properties and minimize loss of water from the produced paste materials.

As illustrated in FIG. 2, pasting of material can be performed from the pasting unit 13 in a continuous screw-type extruder 100 by such means as sheathing, roll-forming, tape-casting, or injection molding process. The extrusion process of the present invention using the extruder 100 provides an improved way of controlling the systems contained in an extruder barrel 16, and improved mixing and homogeneity of the produced materials by introducing the liquid at the downstream end. The physical and electrochemical characteristics such as thickness, porosity, sulfate content, etc. of the electrodes produced by the present invention can readily be varied within the range that is dictated by the relative amount of liquid components and operation parameters of the extruder 100. Furthermore, energy usage and loss is minimized, compared to the conventional procedure, by means of single plate curing. Either anodes or cathodes can be formulated using the process of the invention, depending on the active material feed.

The main advantage of the process of the present invention is the ability to provide a working electrode that can be produced in a single step. Because of this, the changeover of conditions in the procedure, including material feed, fluid injection, and product removal, occurs without stoppage of the procedure, thus eliminating massive amounts of inventory that is normally used for changeover in conventional procedures. The amount of materials handled is greatly reduced by the continuous flow process as well. The process time is reduced from more than 100 hours to less than one hour. It has also been found that product quality is much more consistent due to the ability to precise control of operating conditions such as temperature, pressure, and moisture under the shortened process time.

Furthermore, the process of the present invention overcomes many of the environmental dangers inherent in conventional batch mixing processes. Batch mixing of paste requires a large volume of air flow for cooling. The large volume of air flow presents a serious threat to environmental safety and health risk. Enclosing the mixing process according to the present invention eliminates the need for air flow, as well as the potential for the escape of lead dust to the environment. Also, cleaning the batch mixer requires a large volume of water. This water must then be treated to remove lead and other contaminants. The extrusion-type mixers used in the process of the present invention are inherently self-cleaning and therefore minimize or eliminate this adverse environmental effect. The following is a more detailed step by step description of the process.

Mixing

As set forth above, the transformation of leady oxide powder and water into paste occurs at the mixing zone 10 of the extruder 100. The mechanism of the transformation is the production of a liquid saturated slurry in which water gathers the individual leady oxide particles by means of wedging, surface wetting, and interstitial capillary forces.

When water is first added to the dry oxide powders, the apparent paste density increases sharply due to the incorporation of water into the interparticle spaces. A maximum density is reached when a complete filling of the interstices occurs. Further addition of water causes a decrease in density as the intimate interfacial volume between oxide particles is filled with the wedge water, forming a smooth, spreadable paste.

To understand the nature of this phenomenon, it is necessary to consider the particle-particle and particle-water interactions. When water is added to the oxide particles, the surface of particles becomes negatively charged. The reason for the charge is best explained by the fracture of M—O bonds in the lattice crystal, where M represents the $Pb^{2+}$ component in either tetragonal or orthorhombic form. For each water molecule that is adsorbed, a $H^+$ ion bonds to an oxygen ion on the surface and an $OH^-$ ion bonds to a metal ion on the surface forming two surface hydroxyl groups, M—OH. These hydroxyl groups are capable of acquiring a proton when the pH of the environment is low, and ionizing to lose a proton when the pH of the environment is high (so-called surface regulation) as described in the following equation:

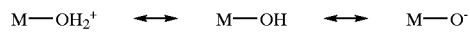

$$M-OH_2^+ \longleftrightarrow M-OH \longleftrightarrow M-O^-$$

Smaller $M^+$ ions preferentially desorb or escape into the solution. As no net transfer of charge occurs by this process, the surface charge (or accumulation of charged ions at the surface) is balanced by the adsorption and dissociation of $H^+$ and $OH^-$ from the surrounding liquid, and a diffuse layer of counter-ions of $M^+$, or $H^+$ ions. An electrical double layer is thus formed at the interface of the dispersed particles of water. Initially, these charged oxide particles are separated from each other due to the repulsive forces between the like-charged surfaces, i.e., stable against agglomeration.

Figure 3:
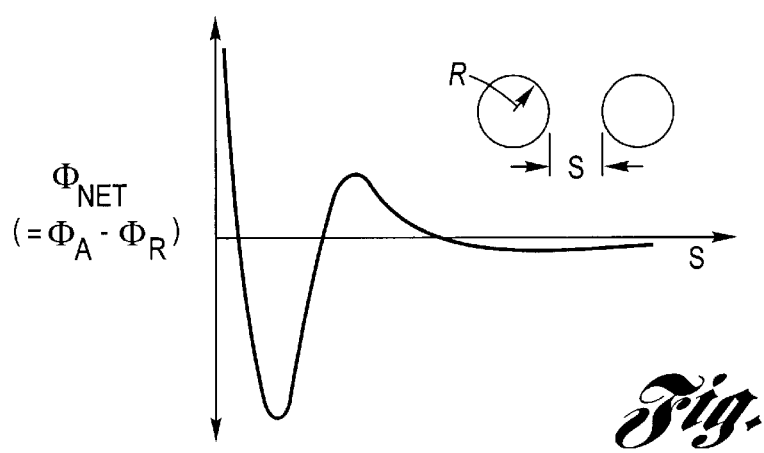
FIG. 3 graphically shows a description of particle net interaction according to the Derjaguin-Landau-Verwey-Overbeek theory, in order to demonstrate the agglomeration of the molecules in the mixing phase of the process of the invention.

To achieve plastic-like characteristics, small particles must be able to agglomerate to form large granules, as the resultant inertia forces greatly exceed the interparticle forces, e.g., friction. The potential energy barrier to agglomeration is primarily determined by the net interaction, Φnet, between the attractive and repulsive forces, Φnet=ΦA−ΦR, such that, once being overcome, agglomeration will proceed as described as described by the Derjaguin-Landau-Verwey-Overbeek (DLVO) theory. As described in FIG. 3, if the particles approach a distance, relative to each other, where the maximum Φnet potential is reached, they will be drawn toward one another to the point where the Φnet reaches a primary minimum to form a floc. At this point, the particles are held together by electrostatic forces instead of capillary forces (as in liquid). Larger particles with increasing pore space thus lead to a decrease in the paste density.

Agglomeration of particles involves the collisions of pairs of primary particles to form "doublets." Each collision results in the loss of a single primary particle, which may be described as the combined effect of Brownian motion and forced collision, namely, peridinetic and orthokinetic, as established in the following equation:

$$-(dn/dt)=[(4\ kT/3\mu)+(16\ Ga^3/3)]n^2$$

where n is the number of particles, k is the Boltzmann constant, T is the temperature, $\mu$ is the liquid viscosity, a is the particle radius, and $G=dV_x/dy=d\gamma_x/dt$ is the shear rate.

If the system is not stirred, only small particles (<10 $\mu$m) form agglomerates by means of a collision induced by thermal convection. Other factors such as small particle size, high temperature and/or low viscosity may also enhance the rate of agglomeration. Accordingly, stirring and other techniques that cause shearing of the dispersed particles can effectively accelerate the agglomeration process. In general, the particles entrained in the faster moving streamlines catch up with those in the slower moving streamlines and collide to form agglomerates. For example, an impeller-type batch stirrer is commonly used in the manufacturing facility. Due to the interaction between solid and liquid as discussed above, the mixing paste is very viscous, and completely lacking of eddy or molecular diffusion. The shear rate, i.e., the change in tangential velocity with respect to radial position $dV_\theta/dr$ is not uniform. Thus, different particles experience different strain histories and accumulate different shear sprains. As a result, the inner portion of the paste may experience as much as 100 times more shear than the paste in the outer portion. In order to ensure that all particles acquire the minimum strain, the mixing time would have to be increased dramatically. However, such an increase in mixing time would cause the inner portion to be over-mixed, causing the formation of large agglomerates since an extremely high strain would be imposed on the inner portion. Similarly, non-uniform mixing will also occur in the vertical direction depending on the locations and shapes of the impeller.

The design objective for a suitable mixer is therefore to produce a minimum distribution of strain within the mixing channel. An ideal mixer would involve a pure drag flow of fluid entering a small gap between two parallel plates in relative motion with each other. The shear rate, dVx/dy, is uniform everywhere in the ideal mixer between the plates, and the total strain experienced by the particles is inversely proportional to the distance from the lower stationary plate.

Figure 4:
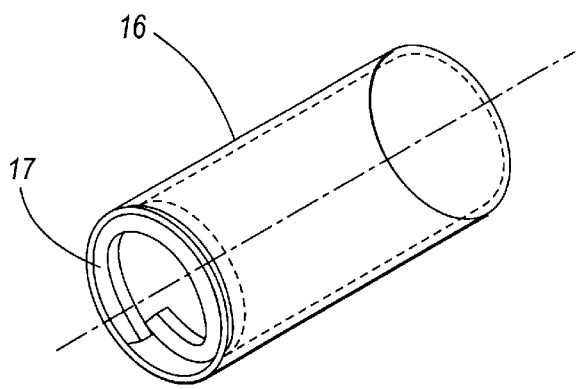
FIG. 4 shows the direction of rotation of a helical channel of an extruder used in the process of the present invention, as well as the direction that materials flow through the helical channel.

In the screw extruder 100 of the present invention, the fluids (i.e., pastes or solid-liquid mixtures) or any other materials are dragged forward in the helical channel formed between the screw and the barrel 16, as shown in FIG. 4. The helical channel 17 defined by the interior walls of the extruder 100 rotates, which causes a constant frictional force, exerted by the moving channel covered by the barrel 18 of the extruder, that serves as an infinite plate. The material inside the helical channel 17 is dragged at a constant rotating velocity, $V_b$, and can be separated into down channel and cross channel components given by $V_{bz}=V_b \cos\theta_b$, and $Vbx=V_b \sin\theta_b$, respectively. The former drags the material toward the exit, where the latter induces the cross channel mixing. Therefore, a steady mechanical flow can be accomplished by simply turning the screw via a motor. In addition, the helical channel creates a velocity component perpendicular to the flight, which results in an internal circulatory flow, i.e., improved mixing actions.

Figure 5:
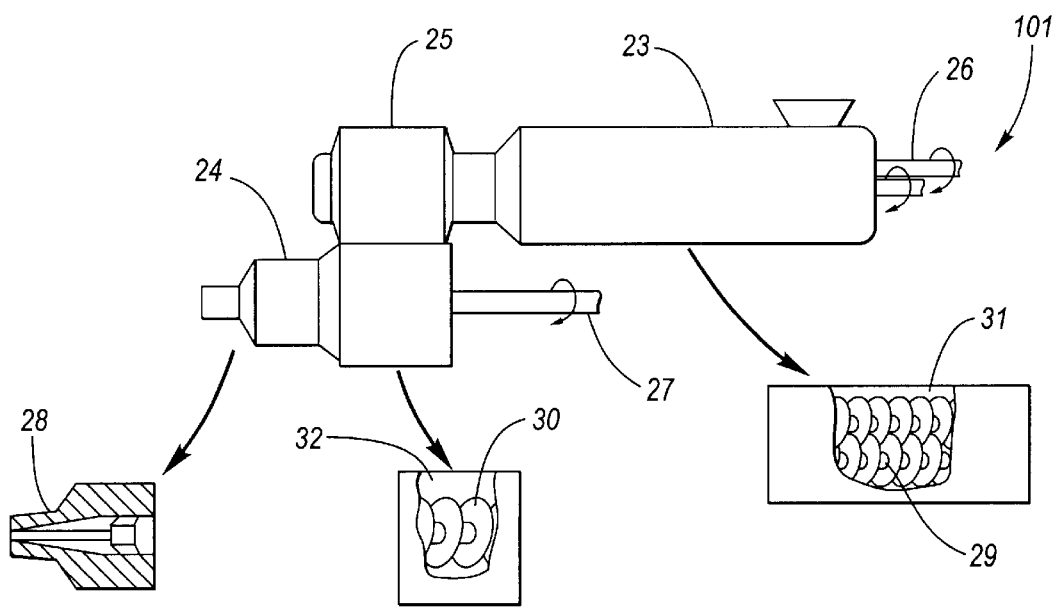
FIG. 5 schematically shows an auger type extruder that is used in a preferred embodiment of the invention.

FIG. 5 shows how an auger type of extruder 101 can be used in a preferred embodiment of the invention. The auger type extruder 101 is often used for ceramic processing. An advantage of the auger type extruder configuration 101 is the ability to use separate zones 23, 24 to allow different stages of the invention to take place at separate zones. For instance, the mixing step, and the reacting step described below can take place in zone 23. The high-shear mixing action that takes place in zone 23 by the pub mill knives 29 on the shafts 26 allows the powders and additives to be premixed and kneaded by rotation of the shafts 26. The pub mill knives 29 can be helical to cause the mixture to move through the cylindrical bore 31 in which the shafts 26 are rotated. The mixture is then transferred to a deairing zone 25, and then to a compacting zone 24 for high pressure extrusion along the length of the cylindrical bore 32, and through the die orifice 28 due to rotation of shaft 27 and the compacting auger components 30. While the zones 23, 24 are connected; they may be separated by a unidirectional valve or any other conventional separation device to allow control of temperature, water and acid content, etc. in separate chambers.

Reacting

The primary functions of sulfuric acid according to the present invention are to bind the large agglomerates to form aggregates, and to produce basic lead sulfate complexes that are suitable for use as the active material in lead-acid battery electrodes. The aggregates of the present invention are hard agglomerates that are held together by solid bridges, i.e., strong primary (covalent or ionic) bonds.

The reaction of sulfuric acid in the leady oxide paste is poorly understood, and the subject of conflicting debates. The most reasonable reaction mechanism is that of the anodization process. It is believed that when acid comes into contact with a lead particle a thin sulfate film forms and acts as a barrier for other sulfate ions, while permitting access of water molecules, as a corresponding species, to the metal surface as set forth in the following equation:

$$Pb+3H_2O=PbO+2H_3O+2e$$

However, this reaction mechanism does not account for the substantial amount of $PbSO_4$, either in crystal form or as part of the basic lead sulfate complexes, found in the produced paste. Furthermore, in order for the oxidation of metallic lead, producing PbO, to proceed in any significant degree, it is necessary to provide a counter electrode to complete the galvanic reaction, e.g., as in anodic coating.

The inventors therefore propose that the oxidation of lead in sulfuric acid is best described by a two-step mechanism. First, the lead particle forms a hydrate during the mixing step in which the solid lattice is formed, as set forth in the following equation:

$$Pb_{(s)}+H_2O=Pb^{2+}{}_{(aq)}+2OH^-{}_{(aq)}+H_2$$

The aqueous form of $Pb^{2+}$ ions is said to be solvated or hydrated having a large number of water molecules attached. These hydrated $Pb^{2+}$ ions are then attracted to the vicinity between the negatively charged oxide particles by means of electrokinetic forces, i.e., attraction, and possibly adsorbed to the surface as counterions.

The second step of the mechanism involves the balance of electrical charges and subsequent integration of $SO_4$ components into the crystal mix. When sulfuric acid is added to the mix, the thickness of the electrical double layer becomes compressed or collapsed, i.e., less negatively charged, as discussed above in terms of the surface regulation process. The $HSO_4$ or $SO_4^{2-}$ ions are therefore able to approach the surface and preferentially react with the hydrated $Pb^{2+}$ ions and the diffused $Pb^{2+}$ from the broken Pb—O crystal surface. The sulfate component apparently functions as a binding agent between individual PbO layers.

The above-described two-step mechanism may explain the observation in adding diluted sulfuric acid to the dry oxide powder without first thoroughly dispersing the dry oxide in water. When so done, water will ionize the solid surface, i.e., negatively charged surface, within a small confined volume. The excess of $H^+$ ions from the acid will then quickly neutralize the surface charge, which promotes a rapid agglomeration of oxide particles due to the collapse of the electrical double layer. Subsequently, the reaction between lead and sulfate ions will essentially be driven to completion in a localized region. The produced sludge will therefore not be suitable for any further processing. Thus, control of the reaction at this point is crucial.

In the extrusion process of the present invention, the addition of concentrated acid may be introduced in different locations along the extrusion barrel 16. An injector may introduce the acid, where the acid can enter the barrel 18 through any of a plurality of unidirectional valves. The kneading actions applied on the active materials will continuously expose new reaction sites to the acid that is injected into the plastic dough, and promote uniform material conversion (i.e., crystal seeds). The temperature of the barrel 16 and the screw 18 may be adjusted precisely to match the optimal reaction rates. Such an extrusion-reaction process may also control the relative amount of other additives and the sulfate content of the final paste, allowing changeover without any process stoppage.

Crystallization—Production of 4BS as a Final Product

In a closed vessel, the produced paste material is allowed to continue its reaction at a high temperature, and complete the conversion of seed crystals to their final chemical state, i.e., 3BS or 4BS. As larger crystals are formed, the amount of water between the particle surface is reduced due to the increase in interparticle pore space or loss of interstitial water, i.e., weak capillary force. Water may thus be evaporated or otherwise removed from, or if necessary added to, the system at various locations within this region to maintain the rheological property of the produced paste. At the end of this process stage, the paste material is expected to contain only the final product as desired and sufficient amount of water for liquid binding that allows the material to flow as a stiff plastic.

Unlike the conditions of batch mixing in an operating system, the present invention uses the high process pressure in the extruder 100 to eliminate the possibility of water evaporation, or other water escape from the paste. Accordingly, a high, and optimal, temperature and moisture content can be maintained throughout the entire crystallization region. The high-temperature condition may also favor the growth of crystals and/or grains that subsequently provides a strong mechanical strength. Additional binders, as in other ceramic processing, may be included prior to extrusion, and preferably at the crystallization stage or later, in order to maintain a favorable rheological extrusion property of the paste.

Pasting and Drying

As the paste material is forced out from a die orifice 19 of the extruder 100 at a relatively high pressure compared to atmospheric pressure, certain paste deformation and rapid evaporation of water are expected. Ideally, such a small volume expansion will lead to an increase in the pore volume, which pushes the crystallines in the network against each other, forming an improved interlocking system when compared to the conventional system.

The doughlike material thus produced is first shaped to a thin sheet with an expanded grid mesh sandwiched in the middle. The amount of materials, porosity, and thickness can be readily controlled by varying the speed of the moving grid 9 on the conveyor 15 shown in FIG. 1, the feed rate to the extruder 100 from the oxide hopper 21 shown in FIG. 2, and the back pressure in the extruder 100.

Drying of the interior regions of the plate is accomplished by the diffusion of water molecules to the plate surface where evaporation occurs. Because a relatively small mount of water is used to prepare the paste in the extrusion reaction process of the present invention, the drying process can be completed with minimal shrinkage of the produced sheet, and in a matter of seconds. In a preferred embodiment of the invention, the expanded grid 9 is pre-heated to the same temperature as the paste in the crystallization region 12, in order to minimize sudden condensation or evaporation of water at the grid-material interface. The pre-heating treatment can be performed directly before the grid 9 reaches the pasting unit 13, in a grid pretreatment unit 14 shown in FIG. 1. Subsequently, dry, hot air may be blown onto the pasted plate surface. The small temperature gradient across a battery plate should provide a sufficient heat source to induce the water diffusion by means of the density difference, and to promote uniform water evaporation deep inside the plate interior.

The invention as described above represents a radical change in the existing pasting/curing process, and can be implemented with only positive effects on the product quality. Such positive effects include improved and more consistent quality of battery plates produced by the process. Battery plates may be produced in a single step process by controlling the parameters on individual plates during mixing, reaction, and pasting processes, rather than the initial condition of a single paste mix. The overall processing or residence time from raw materials to end product is expected to be in the range of between about 5 and about 10 minutes, or less, depending on the rates of reaction and crystallization at the operating temperature.

Additionally, the functionality of the extrusion-reaction process of the present invention may be greatly enhanced by the following procedures. First, the crystallization region may be extended as much as is necessary to allow injection of additional acid. By doing so, high sulfate content plates can be produced that resemble pickled plates in their manner of formation. In these plates, a great amount of lead sulfate may be produced on the surface of well-developed basic lead sulfate crystals. Alternatively, formation may proceed (1) with a short or no pickling period, and (2) under the application of a high formation current. The maximum formation current is often limited by the availability of convertible sulfate component in the electrodes, and restricted by the exothermic heating due to the pickling reaction.

For the preparation of positive electrodes, the lead sulfate rich paste can further be reacted chemically with such strong oxidizing agents as alkaline persulfate and hydrogen peroxide to produce a partially or completely pre-charged lead dioxide paste.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A battery plate making method for a lead-acid battery, which comprises the steps of:

mixing water with a lead oxide;

reacting an acid with said lead oxide in a mixture to produce lead-oxide acid components; and forming a paste comprising interlocking lead acid crystals from said lead oxide-lead acid compounds, characterized in that said mixing, reacting, and crystal forming steps occur in an extrusion apparatus at a high temperature, and said method further comprises the step of extruding said paste from said extrusion apparatus into a grid preheated to approximate a temperature of said paste when said paste is extruded such that said paste is dried to form a battery plate of said lead—acid battery.

2. A method as set forth in claim 1, wherein said extrusion apparatus comprises a first cylindrical bore having a first helical rotatable member disposed therein, the rotation of which causes any material in said first cylindrical bore to be moved toward a die orifice.

3. A method as set forth in claim 1, wherein said acid is sulfuric acid, and said interlocking lead acid crystals are tetrabasic lead sulfate.

4. A method as set forth in claim 1, wherein said grid is brought into contact with said paste by means of a conveyor.

5. A method as set forth in claim 4, wherein said method further comprises the step of adjusting a quantity of paste to be extruded into said grid by adjusting a speed of said conveyor.

6. A method as set forth in claim 1, wherein said extruding step is performed as a sheathing process, a roll-forming process, a tape-casting process, or an injection molding process.

7. A method as set forth in claim 1, wherein said acid is sulfuric acid, and said interlocking lead acid crystals are tribasic lead sulfate.

8. A method as set forth in claim 1, wherein said paste forming step comprises removing a portion of said water from said mixture.

9. A method as set forth in claim 1, wherein said paste forming step comprises adding an additional amount of water to said mixture.

10. A method as set forth in claim 1, wherein said reacting step comprises introducing said acid at a plurality of locations in said extrusion apparatus.

11. A method as set forth in claim 1, further comprising the step of controlling a temperature inside said extruder to optimize said reacting step.

12. A method as set forth in claim 1, further comprising adding chemical binders to said mixture prior to extrusion of said paste.

13. A battery plate making method for a lead-acid battery, which comprises the steps of:

mixing water with a lead oxide;

reacting an acid with said lead oxide in a mixture to produce lead-oxide acid components; and forming a paste comprising interlocking lead acid crystals from said lead oxide-lead acid compounds, characterized in that said mixing, reacting, and crystal forming steps occur in an extrusion apparatus, and said method further comprises the step of extruding said paste from said extrusion apparatus into a grid where said paste is dried to form a battery plate of said lead-acid battery, wherein said extrusion apparatus comprises a first cylindrical bore having a first helical rotatable member disposed therein, the rotation of which causes any material in the first cylindrical bore to be moved toward a die orifice, wherein said extrusion apparatus further comprises a second cylindrical bore having a second helical rotatable member disposed therein, the rotation of which causes any material in said second cylindrical bore to be forced through said die orifice as part of said extruding step.

14. A method as set forth in claim 13, wherein at least said mixing step occurs in said first cylindrical bore.

15. A method as set forth in claim 13, wherein at least said mixing step and said reacting step occur in said first cylindrical bore.

16. A method as set forth in claim 13, wherein said first cylindrical bore is attached to said second cylindrical bore, and said first helical rotatable member is disposed upstream relative to said second helical rotatable member.

17. A method as set forth in claim 16, wherein said first helical rotatable member is physically separated from said second helical rotatable member.

* * * * *